(12) United States Patent
Zhong

(10) Patent No.: US 8,970,179 B2
(45) Date of Patent: Mar. 3, 2015

(54) METHOD, DEVICE AND CIRCUIT FOR CHARGING MULTIPLE BATTERY PACKS OF AN ENERGY STORAGE SYSTEM

(75) Inventor: Shi Zhong, Beijing (CN)

(73) Assignee: Beijing Anruode Mechanical and Electrical Apparatus Ltd, Beijing (CN)

( * ) Notice: Subject to any disclaimer, the term of this patent is extended or adjusted under 35 U.S.C. 154(b) by 452 days.

(21) Appl. No.: 13/496,919

(22) PCT Filed: Sep. 16, 2010

(86) PCT No.: PCT/CN2010/076981
§ 371 (c)(1),
(2), (4) Date: Mar. 19, 2012

(87) PCT Pub. No.: WO2011/032500
PCT Pub. Date: Mar. 24, 2011

(65) Prior Publication Data
US 2012/0187920 A1    Jul. 26, 2012

(30) Foreign Application Priority Data

Sep. 17, 2009    (CN) .......................... 2009 1 0092550

(51) Int. Cl.
H01M 10/46    (2006.01)
H02J 7/35    (2006.01)
H01M 10/44    (2006.01)
H02J 7/00    (2006.01)

(52) U.S. Cl.
CPC ............... *H02J 7/35* (2013.01); *H01M 10/441* (2013.01); *H02J 7/0013* (2013.01); *H02J 7/0077* (2013.01); *H02J 7/0093* (2013.01); Y02E 10/566 (2013.01)
USPC ...................................................... 320/139

(58) Field of Classification Search
USPC .......................... 320/107, 116, 132, 139, 141
See application file for complete search history.

(56) References Cited

U.S. PATENT DOCUMENTS

2003/0006734 A1    1/2003    You
2008/0281732 A1*   11/2008    Yamada .......................... 705/30
2009/0107743 A1*    4/2009    Alston et al. ............... 180/65.21

FOREIGN PATENT DOCUMENTS

| CN | 2212280 Y | 11/1995 |
| CN | 2344909 Y | 10/1999 |
| CN | 1574542 A | 2/2005 |
| CN | 201044366 Y | 4/2008 |
| CN | 101651239 A | 2/2010 |
| CN | 101673963 A | 3/2010 |

OTHER PUBLICATIONS

International Search Report dated Nov. 30, 2010 for related PCT Patent Application No. PCT/CN2010/076981.

* cited by examiner

*Primary Examiner* — Edward Tso
(74) *Attorney, Agent, or Firm* — Troutman Sanders LLP; Ryan A. Schneider; Christopher W. Glass

(57) ABSTRACT

A method for charging multiple battery packs is disclosed, which comprises the steps of providing full output power of the power conversion unit to a first battery pack in a charging cycle at the control of a first control signal; monitoring in real-time the charging acceptance of the first battery pack and when the charging acceptance detected is less than the available full output power of the power conversion unit, charging a second battery pack by the remaining output power, i.e. the output power difference between the full available output power and the charging acceptance of the first patent pack, at the control of a second control signal. The service life of battery is extended and the efficiency of the PV module is increased in the system where in the method is implemented. A device for charging multiple battery packs is also disclosed.

23 Claims, 6 Drawing Sheets

METHOD, DEVICE AND CIRCUIT FOR CHARGING MULTIPLE BATTERY PACKS OF AN ENERGY STORAGE SYSTEM

CROSS-REFERENCE TO RELATED APPLICATIONS

This application is a US National Stage of International Application No. PCT/CN2010/076981, filed 16 Sep. 2010, which claims the benefit of CN 200910092550.X, filed 17 Sep. 2009, each herein fully incorporated by reference.

TECHNICAL FIELD

The present invention generally relates to advanced charging method and control system for energy storage batteries and more particularly to the rechargeable batteries for photovoltaic (PV) and wind power generation systems, or hybrid wind/PV power generation systems thereof.

BACKGROUND ART

Stand-alone photovoltaic (PV) system is considered as promising renewable power sources for remote areas, independent home unit and street light. A typical model of this system, as shown by the block diagram in FIG. 1, was composed by the PV arrays the energy convert unit (101), storage batteries (103) and the system control unit (102). It converts the solar energy into electrical energy, stores it into the battery system during the day and then re-loads it during evening or when required. The charge and discharge of battery is controlled by the control unit. In real application, the energy storage system (here are the batteries) needs to have sufficient capacity for ensuring the stored energy which can be last a few days for continuous cloudy days. In this case, the energy storage system could not be fully charged during the day, but needs discharged during the night. The energy storage system batteries in a stand-alone PV system normally has been cycled between 20~80% deep of discharge (DoD), i.e., under Partial State of Charge (PSoC).

Maximum power point tracking (MPPT) is widely published technology in recent years for increasing the charge efficiency of PV system. However, the energy storage system (the inherent character of the storage battery) normally has a high charging acceptance at a lower State of Charge (SOC) and a lower charging acceptance at a high SOC. Stand-alone PV system normally employs valve regulated lead acid (VRLA) battery for its energy storage. In order to enable fast and fully charge the batteries in the energy storage system, people prefers to install a PV array with high power output, but a VRLA battery, the gassing point is normally around 2.35V/per cell under the temperature of 25° C., depends on the environment, the electrolyte density and SOC. Once reaching the gassing point, the charging acceptance of the battery will be reduced, part of the input energy (the charging current) goes to the side reaction: electrolysis-gassing. Once reach the gassing point, the higher charging current and the higher gassing. The high gassing not only wastes the input energy, worse on that, it accelerates the battery aging and reduces the battery service life.

Moreover, one most concerned is that the storage batteries (the group of battery) of the stand-alone PV system, under the current technology and current service condition, often operated under the PSoC condition, as continuous cloudy days will make the storage batteries in sufficiently charged, if frequently repeated and prolonged, severe negative plate non-reversible sulfation in the lead acid cells will happen, even with enough charging power from PV system by following shining days. This will result the battery capacity lose and reduced service life.

This will happen to all kinds of PV systems, including the stand-alone PV system and the Wind-PV Hybrid system. Because the instability of the original energy, either from solar or wind.

It has been reported by Wu Bo in the journal of Electrical and Electronic Technologies (Chinese, February 2008) that "The design and application of group of batteries for PV system", has described a method to charge the lithium battery by alternatively with constant current and constant voltage.

The Chinese patent No. CN02282038.8 disclosed "a pulse charging method for PV system" with a pulse charging to replace the constant floating charging after the rechargeable battery has been fully charged.

For improving the cycle life of battery, the present applicant in his Chinese patent No. CN01117645.5 disclosed a unique charging method with pulse charging/discharging, and with measured pulse current, the voltage of gassing point, temperature compensation to predict the SOC. Those are enclosed as the background of the invention.

SUMMARY OF THE INVENTION

The present invention relates to a charging method for multiple battery packs, particularly, for improving the cycle and service life of lead acid batteries in energy storage systems under partial state of charge condition, and enhancing the energy transfer efficiency. According to this invention, for a fixed energy output from PV arrays or Wind turbine system, the battery packs in the energy storage system will be sub-grouped into two or more groups of battery packs, and adaptively change the sequence order of the battery packs during the charging process.

A method for charging multiple battery packs in one embodiment of the invention comprising following steps: charging a first battery pack at the full available output power of a power conversion unit in response to a first control signal in a charging cycle when the charging acceptance of the first battery pack is not less than the full available output power of the power conversion unit; and monitoring in real-time the charging acceptance of the first battery pack and charging at same time the second battery pack with the remaining power output at the control of a second control signal when the charging acceptance of the first battery pack is less than the full available output power of the power conversion unit.

The power conversion unit can be a PV module of a PV system or a wind turbine module of a wind power system.

In the case of a PV system, the charging cycle can be set at a natural day. In the case of a Wind-PV Hybrid system, the charging cycle can be set depend on the actual application of the system, e.g. time necessary for the first battery pack to be fully charged or time required for the battery pack to be charged and discharged.

In the subsequent charging cycles, the sequence order of the battery packs can be adjusted such that each battery pack can be sequentially arranged as the first battery pack in any of the cycles.

The charging acceptance of the battery packs can be detected by measuring the gassing point voltage, or Soc, of the battery packs.

The gassing point voltage and SoC of each battery pack is determined by a controller through measurement of voltage, current and Dv/Dt for the battery pack during charging cycle.

The charging voltage can be compensated depending on the temperature of the battery packs measured by the control unit during charging.

The amplitude of the average charging current of the first battery pack and the second battery pack is represented by the magnitude of the first control signal and the second control signal.

The first control signal and the second control signal can be Pulse width Modulated (PWM) signals, wherein both of the first and the second control signals are contained in the Main PWM Cycle and are time shared valid. In the starting stage of the charging process, the duty ratio of the first control signal can be set at a maximum value such that the full available output power of the power conversion unit can be directed to the first battery pack.

With the charging acceptance of the first battery pack drops and when the point where the available output of the power conversion unit exceeds the charging acceptance of the first battery pack, the second control signal is activated and the duty ratio of the second control signal is increased and the duty ratio of the first control signal is decreased corresponding to the drop of the charging acceptance of the first battery pack.

During the charging process, the duty ratio of the first control signal and the second control signal corresponding to the duty ratio of pulse currents of the first and the second battery packs.

The charging system can further comprise a third battery pack, or more battery packs which can be charged at the same time when power difference between available output power of the power conversion unit and the charging acceptance of the currently charging battery pack(s) is detected.

In another aspect of the invention, a device for charging multiple battery packs is provided, which comprises means for controlling a first control signal for charging a first battery pack, means for controlling a second control signal for charging a second battery pack, means for monitoring charging acceptance of the first battery pack and the second battery pack, and means for adjust the first control signal and the second control signal according to the detected charging acceptance of the first battery pack and the second battery pack. In the initial stage of a charging cycle, the charging acceptance of the first battery pack is sufficient large therefore, the duty cycle of the first control signal is at a maximum value such that the first battery pack is charged by the power conversion unit to charge at full available output power of the power conversion unit. With the charging acceptance of the first battery pack drops to a point that is less than the available output of the power conversion unit, the duty cycle of the first control signal is decreased gradually and at the same time the second control signal is activated and the duty cycle of which is gradually increased. So that the magnitude of charge current to the first battery pack and the second battery pack will be balanced and optimized according to the charging acceptance during each charge cycle.

The whole charging process can be monitored and the status of the charging process can be stored in a memory.

Further, in order to suppress the sulphation of the battery plate, the system can be further provided with a pulse wave generator, or pulse generator, for applying a continuous pulse current to the battery packs.

The battery packs can be connected to a load via respective switching elements such as diodes, transistors, MOSFETs and/or thyristors.

Moreover, a depolarization discharging function or circuit can be provided to provide depolarization negative pulse during the pulse charging process of the battery packs.

The device further comprise a pulse generator whose output pulse are controlled by the controller and is applied to the battery packs.

The invention is aiming at resulted from solve the problem of insufficient charge or Partial State of Charge (PSOC) due to unstable power supply of the power conversion unit in the PV and/or wind power system in the prior art. According to the method and device provided herein, the problem is solved by monitoring the charging acceptance of the battery packs and optimizing use available power of the power conversion unit to charge a number of battery packs depending on the charging acceptance detected.

Specifically, in one charging cycle, a plurality number of battery packs can be charged simultaneously by pulse current so that the maximum power of the power conversion unit can be fully utilized.

Pulse maintenance on battery packs can be carried out in the embodiments of this invention not only after the battery packs are fully charged but also during PSOC charge and non-charging or discharging states of the battery packs, whereby the effect of desulphation is strengthened.

In this invention, as the batteries are designed and divided into battery packs in which the batteries have relatively small capacity, it is likely that the first battery pack can be fully charged even in the situation that the power conversion unit cannot provide full rated power due to cloudy or rainy days for PV system or during windless weather for wind turbine system.

The charging statues can be stored in a memory of the controller. When a first battery pack was fully charged in a charging cycle, after that in the next charging cycle the order of the battery packs is rearranged so that the second battery pack is renumbered as the new first battery pack and is then charged in a prioritized order. The effect of such arrangement is that the service life of all the battery packs can be kept at a maximum time since even in bad weather days such as cloudy or rainy days for PV system or windless days for wind turbine system. All the battery packs in the system can be sequentially charged thus no battery pack will be left insufficient charge for long term which however may result in failure of the negative electrode plate.

In this invention, the efficiency of the power conversion unit can be enhanced since the charging process of the second battery pack can be started when the first battery pack reaches its gassing point voltage (i.e. the charging acceptance of the battery pack will drop gradually afterwards). As a result, the power conversion unit may have a relatively lower rated power output which would consequently lower the cost of the whole system.

Although the invention can be implemented in the field of solar power system to solve the problem of battery service life decline during service, it shall be understood by those skilled in the art that it can also be implemented in wind turbine systems or solar-wind hybrid power systems.

PREFERRED EMBODIMENTS

The control method and system in this invention is applicable to those power systems that contain at least two battery packs with each battery pack contains at least one battery. The number of packs can be determined according to specific application, e.g. for a 100 AH PV system, two battery packs can be provided with a capacity of 50 AH in each pack, the controller can be configured to control the charging the battery packs separately, and monitoring the parameters of the battery packs, e.g. voltage, current and temperature separately.

A power system having two battery packs will be described as example of the invention. Those skilled in the art however should understand that the method and system described herein after is also applicable to power systems having three or more battery packs.

In the case of a PV system, the charging cycle described in this invention can be a nature day of 24 hours but can also be set to other specific time span, e.g. several hours, several nature days.

Figure 1:
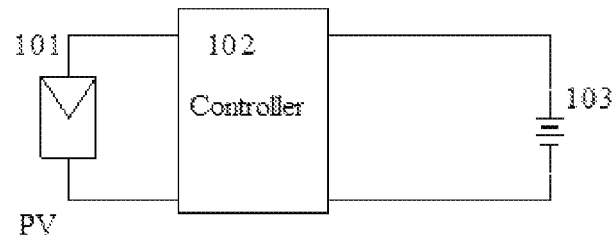
FIG. 1 is a block diagram of a charging system in the prior art.
Figure 2:
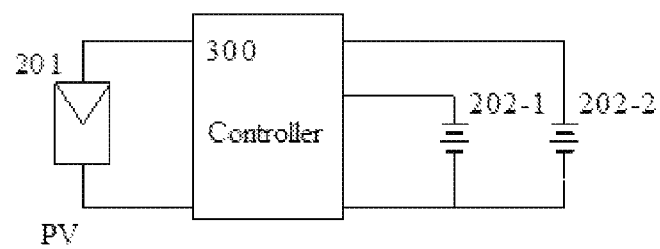
FIG. 2 is a block diagram of the charging system used by the method and system of this invention.

FIG. 2 is a block diagram of a possible power system where the method and device of this invention can be implemented. According to FIG. 2, the power system comprising a PV module 201, a controller 300 and two battery packs 202-1, 202-2.

Figure 3:
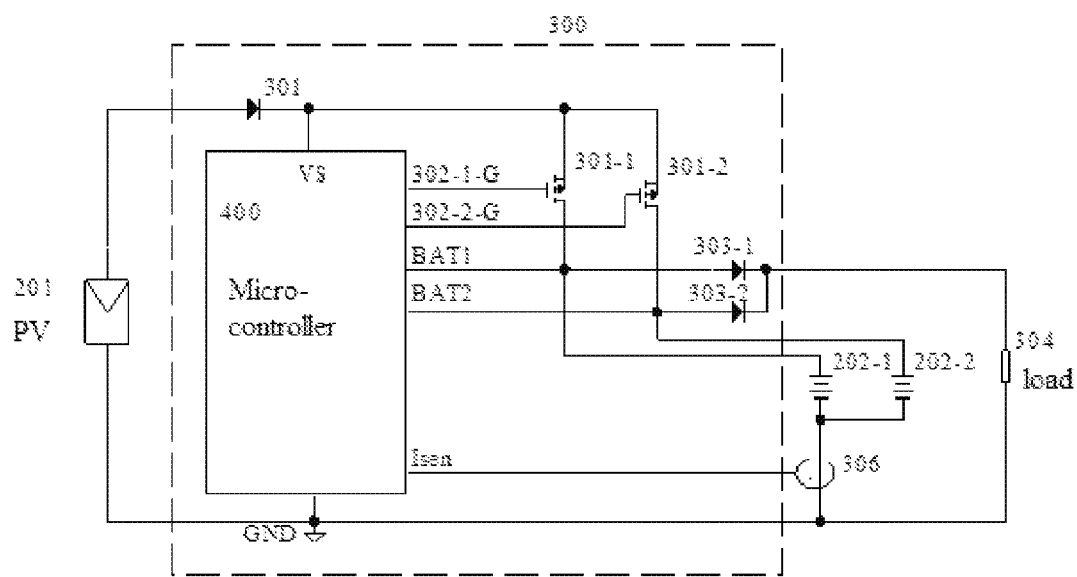
FIG. 3 is a diagram of the control system according to one embodiment of the invention.
Figure 4:
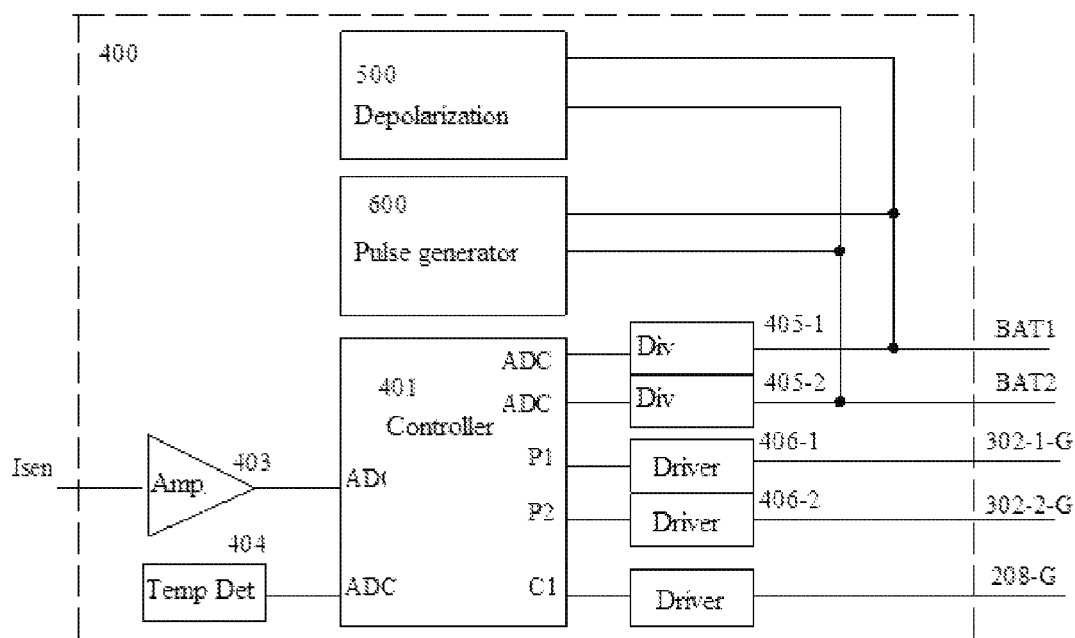
FIG. 4 is block diagram of an embodiment of a control unit according to this invention.

One possible implementation of controller 300 is shown in FIG. 3 wherein the charging of the two battery packs 202-1, 202-2 is controlled by the respective switching elements 302-1, 302-2 in the circuit. The two battery packs are also connected to load 304 through respective switching elements 303-1, 303-2. The switching element 303-1 and 303-2 can be diode switch or other controllable switching elements such as MOSFETs. The circuit further contain current detecting device 306 for providing Isen. The controller comprising a control unit 400 for realizing PWM charging, system control, pulse output and depolarization discharging.

In the embodiment, the control unit 400 comprising a microcontroller 401, a pulse output function or circuit 600 and a depolarization function or circuit 500. The positive terminal BAT1, BAT2 of each battery pack 202-1, 202-2 is provided to an ADC port voltage detection function or circuit of the microcontroller 401 via respective voltage dividing function or circuit 405-1, 405-2, and current detection signal is provided to the ADC port via instrument amplifier for current detection. Two PWM control signals PWM1 and PWM2 are provided by the microcontroller to the respective driver 406-1 and 406-2 for generating control signal 302-1-G, 302-2-G for controlling the switching element 302-1 and 302-2 so that the charging of the battery packs 202-1 and 202-2 are controller by the port P1 and 2 of the microcontroller. The microcontroller is provided with an ADC.

Figure 5:
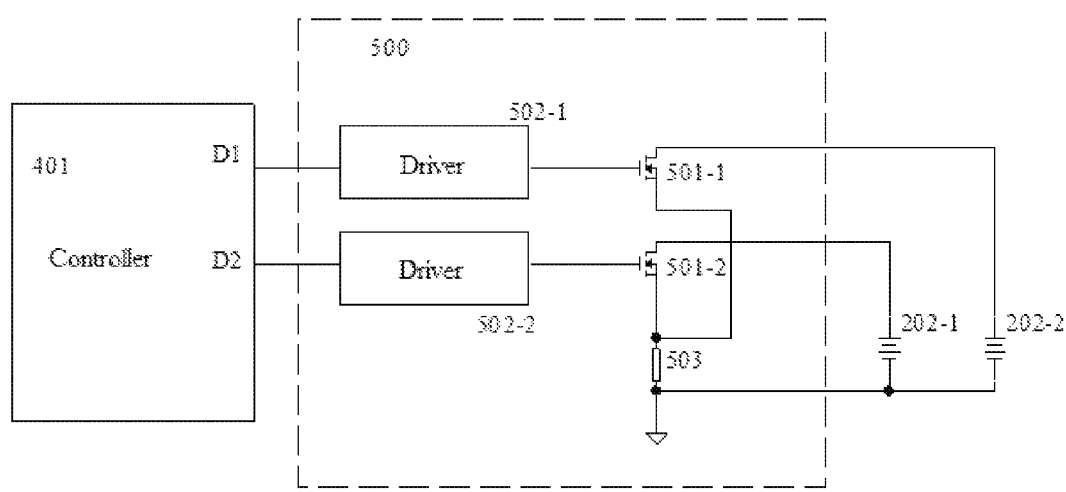
FIG. 5 is a block diagram of depolarization function or circuit according to one embodiment of the invention.

FIG. 5 is a schematic diagram of the depolarized negative pulse charging and discharging function or circuit which comprises drivers 502-1, 502-2, switching elements 501-1 and 501-2 and discharging resistor 503. The microcontroller generates negative pulse driving signal which are provided through port D1 and D2 to the respective driver 502-1 and 502-2 to control on/off of the switching elements so that depolarization negative pulse can be applied to the discharging resistor 503 by the battery packs.

Figure 6:
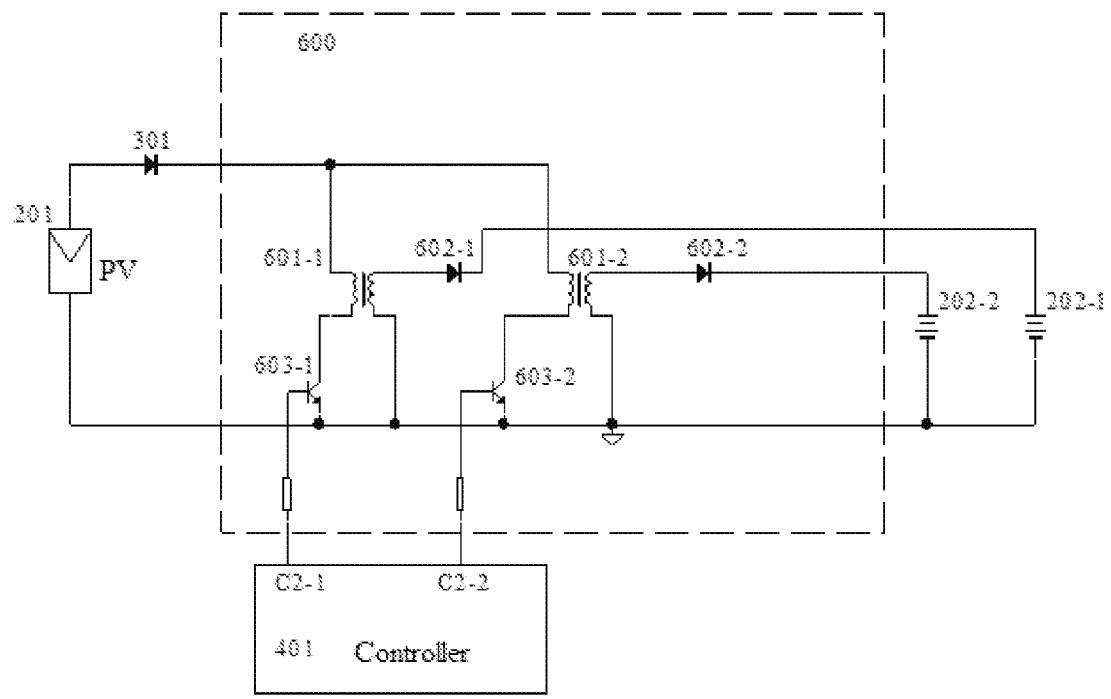
FIG. 6 is the block diagram of a pulse generator according to one embodiment of the invention.

FIG. 6 is a diagram showing an implementation of the pulse generator which generates pulse signal according to the program of the microcontroller 401 and uses the I/O port C2-1, and C2-2 of the microcontroller. The pulse generated are applied to the respective battery packs 202-1, 202-2 via MOSFET 603-1, 603-2, transformer 601-1, 601-2 and diode 602-1 and 602-2.

When a battery pack is not in the charging or discharging state, the pulses generated are applied to both of the battery packs by the controller. The power of the pulse generator can be the solar module in daytime and can be battery pack itself at night or no light days. As pulses generated are applied to both battery packs when the batteries therein are not in their charging or discharging state, pulse protection is realized and hence sulphation is relieved regardless a battery pack is fully charged or not, this is especially effective for the insufficient charged batteries. The pulse generator can be multi-harmonic oscillator of any type having a working range of 1 Hz to 100 KHz, and preferably in the working range of 100 Hz to 10 KHz.

Figure 7:
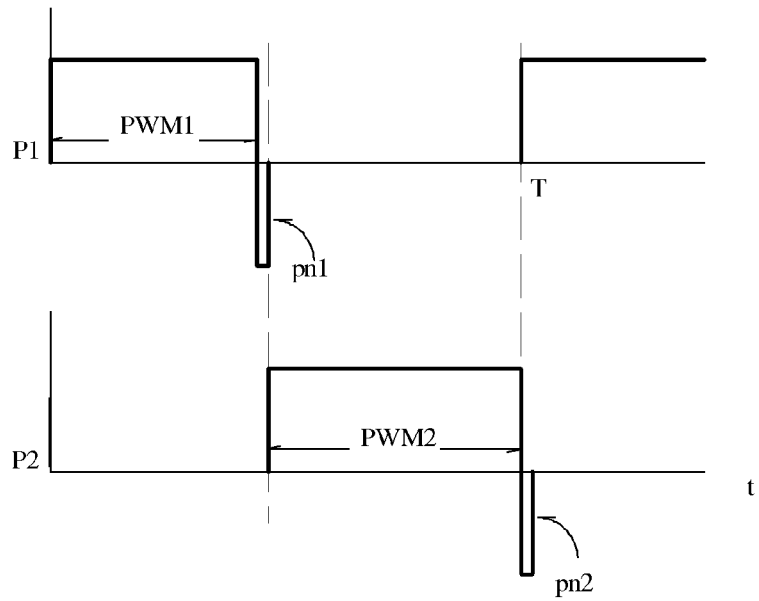
FIG. 7 illustrates the waveform of a PWM signal output by the controller according to one embodiment of the invention.

PWM waveform output by the microcontroller is shown in FIG. 7 in which the horizontal axial is time and the vertical axial is the amplitude of the PWM signal, i.e. amplitude of the charging current. PWM1 represents the first control signal and PWM2 represents the second control signal, both of PWM1 and PWM2 are contained in one Main PWM signal cycle T and are time shared valid. The duty ratio of the first battery pack is K1=PWM1/T which is determined by the maximum charging acceptance of the battery pack to be charged. The duty ratio of the second battery pack is K2=PWM2/T. When the first battery pack is charging, the value of K1 approaches or equals to 1, where the value of K2 the value of K1 approaches or equals to 0. As a result, the full power output of the solar module are directed to the first battery pack, with the first battery pack is gradually charged, the charging acceptance of the first battery pack drops gradually, whereby the value of K1 shall be gradually reduced and approaches 0 when the first battery pack is fully charged. With the reduction of K1, i.e. charging current to the first battery pack reduces to approaching 0, the value of K2 is raised gradually, i.e. the charging current of the second battery pack increases gradually until the second battery pack is fully charged or the solar module cannot output power duly bad weather conditions. Throughout the process, K1+K2≤1.

In the Figures, pn1 and pn2 are respective depolarization pulse, i.e. negative pulse for the first battery pack and the second battery pack during the charging process, which means the battery packs are discharged for depolarization during the charging process. Specifically, in a Main PWM charging cycle, a negative pulse will be applies via the discharging function or circuit to a battery pack when the battery pack is fully charged. It is found that gassing and sulphation are relieved if the batteries in the packs are depolarized by negative pulse during charging process, whereby longer battery service life can be achieved.

Figure 10:
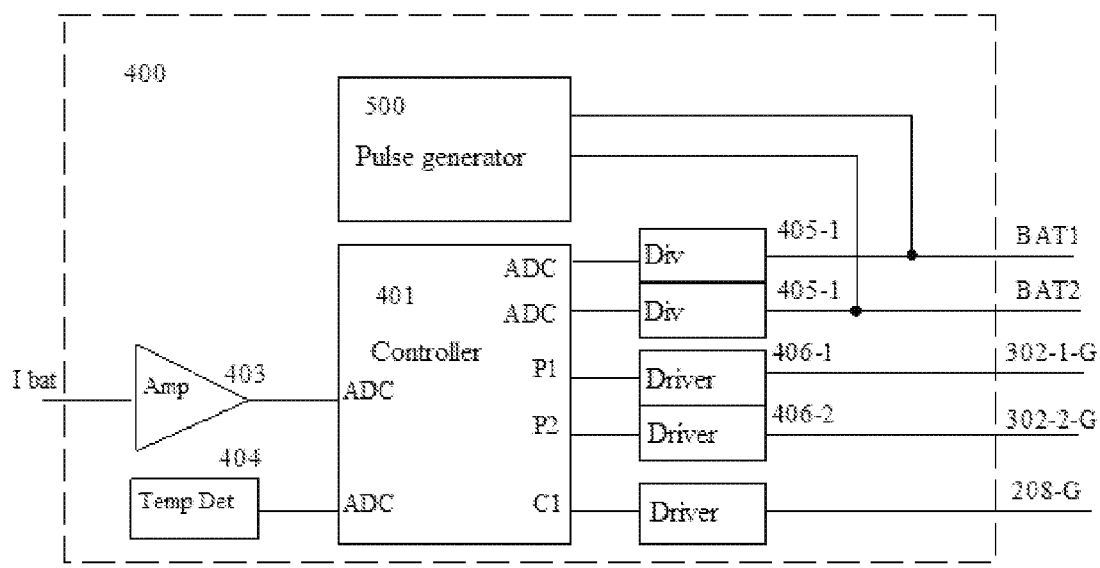
FIG. 10 is a circuit diagram of the control unit according to another embodiment of the invention.

A second embodiment of the invention is shown in FIG. 10. In this embodiment, the depolarization function or circuit is removed. As shown in FIG. 10, the positive end BAT1 and BAT2 of the respective battery pack 202-1 and 202-2 is connected to the ADC port of the microcontroller 401 via respective voltage dividing function or circuit 405-1 and 405-2 to form a voltage detection function or circuit, the charging function or circuit of battery packs also includes current detection function or circuit, e.g. a sampling resister, 306 in FIG. 3, and instrument amplifier 403 to provided current detection to the ADC port of the microcontroller 401. Two PWM control signals PWM1 and PWM2 are provided by the microcontroller to the respective driver 406-1 and 406-2 for generating control signal 302-1-G, 302-2-G for controlling the switching element 302-1 and 302-2 so that the charging of the battery pack 202-1 and 202-2 are controller by the port P1 and 2 of the microcontroller.

Figure 11:
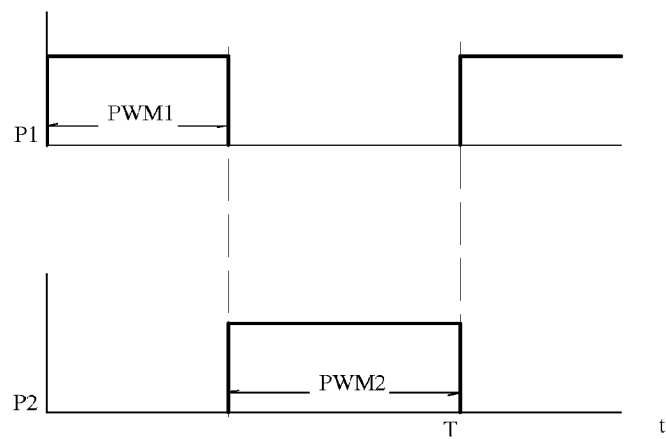
FIG. 11 illustrates the waveform of a PWM signal output by the controller according to another embodiment of the invention.

PWM waveform output by the microcontroller is shown in FIG. 11 in which the horizontal axial is time and the vertical axial is the amplitude of the PWM signal, i.e. amplitude of the charging current. PWM1 represents the first control signal and PWM2 represents the second control signal, both of PWM1 and PWM2 are contained in one Main PWM signal cycle T and are time shared valid. The duty ratio of the first battery is K1=PWM1/T which is determined by the maximum charging acceptance of the battery to be charged. The duty ratio of the second battery is K2=PWM2/T. When the first battery pack is charging, the value of K1 approaches or equals to 1, where the value of K2 the value of K1 approaches or equals to 0, as a result, the full power output of the solar module are directed to the first battery, which the first battery pack is gradually charged, the charging acceptance of the first battery pack drops gradually, whereby the value of K1 shall be gradually reduced and approaches 0 when the first battery pack is fully charged. With the reduction of K1, i.e. charging current to the first battery pack reduces, while the value of K2 is raised gradually, i.e. the charging current of the second battery pack increases gradually, until the second battery pack is fully charged or the solar module cannot output power duly bad weather conditions. Throughout the process, $K1+K2 \leq 1$.

Figure 8:
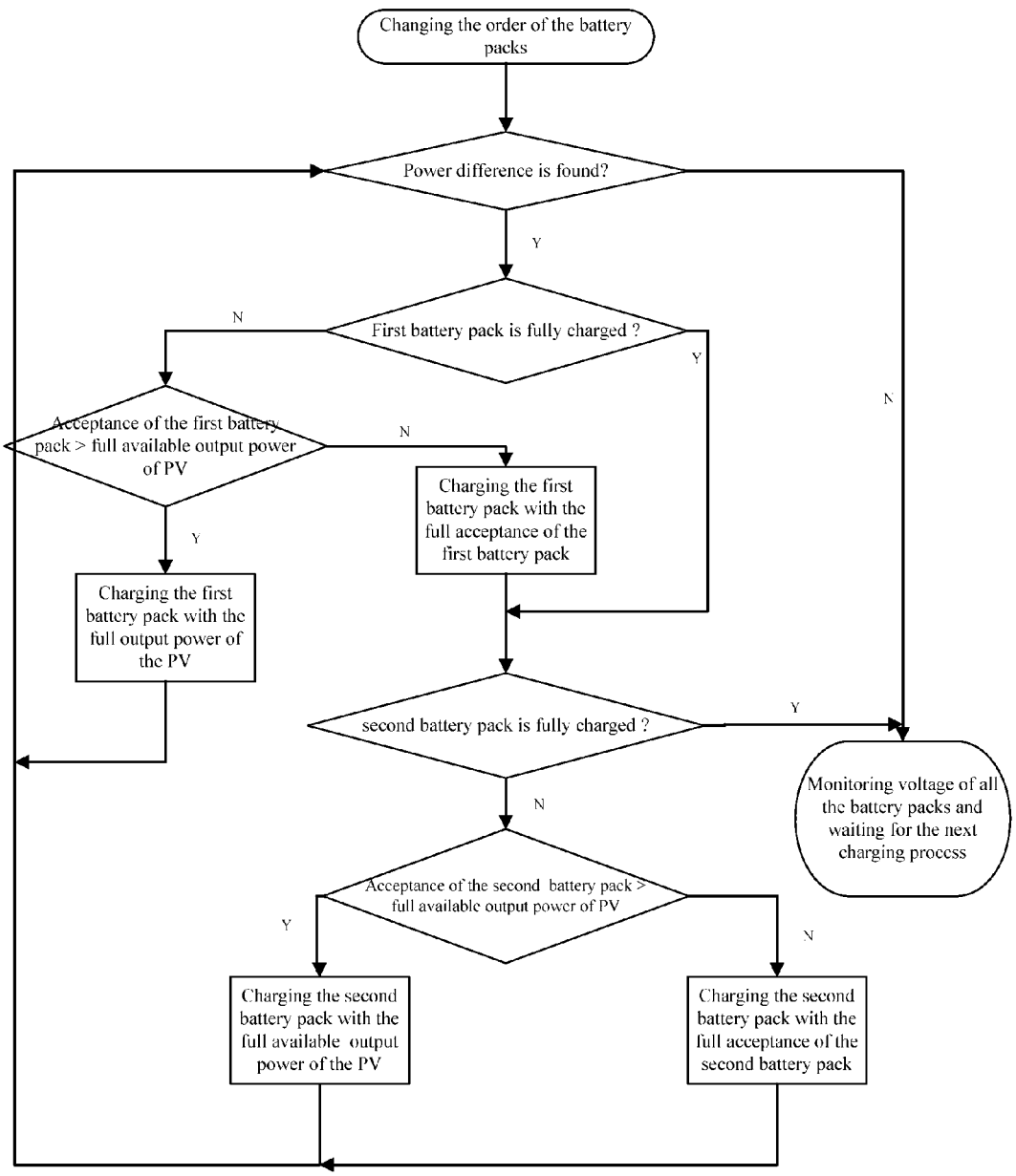
FIG. 8 is the control sequence for PWM output in one charging cycle.

A charging sequence block diagram of a charging cycle is shown in FIG. 8. According to FIG. 8, in a subsequent charging cycle, if the first battery pack has not reached its gassing point voltage, it will still be charged in this charging cycle; if, however, the first battery pack has reached its gassing point voltage, the second battery pack is renumbered as the new first battery pack and the charging process for the new first battery pack will be started in this charging cycle.

During the entire charging process, a control signal for a number of battery packs can be coordinated base on the detection of the charging acceptance of each battery pack and the output power of the solar module. In this invention, the simultaneous charging refers to the controller of a battery system have m battery packs providing control signal in a main PWM cycle T, where each battery pack is assigned a charging control signal PWMi ($0 < i \leq m$). The charging control signal for the first battery pack is PWM1, and the charging control signal for the second battery pack is PWM2, and so on. When the control signal PWMi for a battery pack is valid, the battery pack will be charged. In a main PWM cycle, it is controlled by the controller that charging control signals are time shared valid, i.e. in a main PWM cycle, all battery packs are charged sequentially. Time for the main PWM cycle T can be set freely, e.g. at several milliseconds, or several minutes.

If the time of the main PWM cycle is T, the duty ratio of the respective battery packs, K1, K2, ... Km shall be K1=PWM1/T, K2=PWM2/T, Km=PWMm/T, $\Sigma Ki \leq 1$. In marginal conditions, e.g. K1=1 means only the first battery pack is charging, e.g. K1=0 means the first battery pack is fully charged and the charging process for this battery pack has been stopped.

In a normal charging sequence, a first control signal K1=1 is sent to the PWM drivers, full power output of the solar module will be provided to the first battery pack. During the charging process, status of the first battery pack is monitored or detected. When the first battery pack reaches its gassing point voltage which means that from this point of time the charging acceptance of the battery pack is gradually reducing, when it is further detected that the charging acceptance of the first battery pack is lower than the output of the solar module, K1 is gradually reduced, whereas K2 is gradually raised which means from this point of time charging process for the second battery pack has started.

The charging current of the second battery pack is determined by K2 which is increasing when K1 is decreasing. When the first battery pack is fully charged, the K1 is reduced to 0 so that charging to the first battery pack is stopped. In case there is a third battery pack in the system, the second battery pack is monitored by detecting its gassing point, when its gassing point is reached which means the charging acceptance of the second battery pack will decreases from this point, the charging process of the third battery pack is started. The control mechanism is similar when there are more than three battery packs in the system.

The charging current mentioned above refers to average charging current and is in the form of pulse wave during charging.

Figure 9:
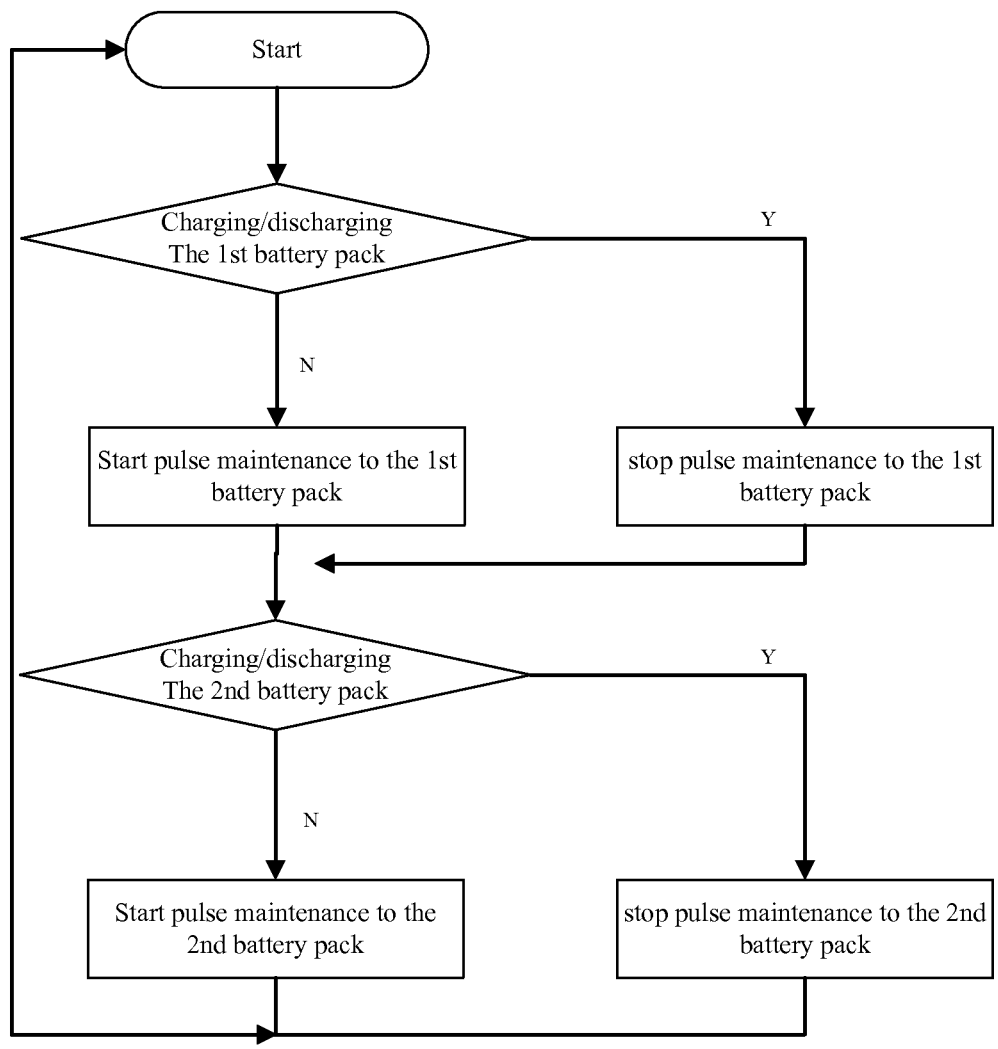
FIG. 9 is the sequence for pulse maintenance.

The pulse maintenance sequence block diagram is shown in FIG. 9. From the figure it can be seen that pulse maintenance will be applied to the battery packs unless they are in the charging or discharging process.

The charging status of each battery pack is stored in a memory. In a following charging cycle, the charging status of stored can be referred to. A new battery pack will be selected if all the relevant battery packs have been fully charged in the previous cycle, e.g. the second battery pack will be selected if the first battery pack has been fully charged in the previous cycle. This arrangement is advantageous in that all battery packs will be charged sequentially such that no battery pack will be in a longtime insufficient charging and failure of the negative electro plate can be minimized as a result.

What is claimed is:

1. A method for charging multiple battery packs of an energy storage system comprising:
   providing full output power of the power conversion unit to a first battery pack in a charging cycle at the control of a first control signal;
   monitoring in real-time the charging acceptance of the first battery pack; and
   when the charging acceptance detected approaches or is less than the available full output power of the power conversion unit, charging a second battery pack with the remaining output power at the control of a second control signal;
   wherein the order of the battery packs can be rearranged sequentially such that each battery pack can be numbered as the first battery pack in different charging cycles.

2. The method according to claim 1, wherein the first control signal and the second control signal are PWM signals which are contained in a main PWM signal and time shared valid.

3. The method according to claim 1, wherein a duty ratio of the charging current of the first battery pack is the duty ratio of the first control signal; and
   wherein the charging current of the second battery pack is the duty ratio of the second control signal.

4. The method of claim 1, wherein a duty ratio of the first control signal is maximized at the initial charging stage of the first battery pack, and once it is detected that the charging acceptance of the first battery pack is less than the available output power of the power conversion unit, the first control signal is decreased and the second control signal is activated and increased.

5. The method according to claim 1, wherein whether the charging acceptance of each battery pack is decreasing is detected by measuring a gassing point voltage of the battery pack.

6. A method for charging multiple battery packs of an energy storage system comprising:
   providing full output power of the power conversion unit to a first battery pack in a charging cycle at the control of a first control signal;
   monitoring in real-time the charging acceptance of the first battery pack; and
   when the charging acceptance detected approaches or is less than the available full output power of the power conversion unit, charging a second battery pack with the remaining output power at the control of a second control signal;
   wherein whether the charging acceptance of each battery pack is decreasing is detected by measuring a gassing point voltage of the battery pack.

7. The method according to claim 6, wherein the order of the battery packs can be rearranged sequentially such that each battery pack can be numbered as the first battery pack in different charging cycles.

8. The method according to claim 6, wherein the first control signal and the second control signal are PWM signals which are contained in a main PWM signal and time shared valid.

9. The method according to claim 6, wherein a duty ratio of the charging current of the first battery pack is the duty ratio of the first control signal; and
   wherein the charging current of the second battery pack is the duty ratio of the second control signal.

10. The method of claim 6, wherein a duty ratio of the first control signal is maximized at the initial charging stage of the first battery pack, and once it is detected that the charging acceptance of the first battery pack is less than the available output power of the power conversion unit, the first control signal is decreased and the second control signal is activated and increased.

11. A device for charging multiple battery packs of an energy storage system comprising:
   means for providing a first control signal to a first battery pack;
   means for providing a second control signal to a second battery pack;
   means for monitoring the charging acceptance of the first battery pack and the second battery pack;
   means for adjusting the first control signal and the second control signal according to the charging acceptance of the first battery pack and the second battery pack; and
   a depolarization function or circuit for applying a negative pulse to the battery packs during the charging/discharging process of the battery packs.

12. The device according to claim 11 further comprising a pulse generator for providing controller controlled pulses applied to the battery packs.

13. The method according to claim 11, wherein respective battery packs are connected in parallel to a load via respective switching elements.

14. A device for charging multiple battery packs of an energy storage system comprising:
   means for providing a first control signal to a first battery pack;
   means for providing a second control signal to a second battery pack;
   means for monitoring the charging acceptance of the first battery pack and the second battery pack; and
   means for adjusting the first control signal and the second control signal according to the charging acceptance of the first battery pack and the second battery pack;
   wherein respective battery packs are connected in parallel to a load via respective switching elements.

15. The device according to claim 14 further comprising a pulse generator for providing controller controlled pulses applied to the battery packs.

16. The device according to claim 14 further comprising a depolarization function or circuit for applying a negative pulse to the battery packs during the charging/discharging process of the battery packs.

17. A circuit for charging multiple battery packs of an energy storage system comprising:
   a first controller providing a first control signal to a first battery pack;
   a second controller providing a second control signal to a second battery pack;
   a third controller monitoring the charging acceptance of the first battery pack;
   a fourth controller monitoring the charging acceptance of the second battery pack;
   a first signal adjuster for adjusting the first control signal according to a charging acceptance of the first battery pack; and
   a second signal adjuster for adjusting the second control signal according to a charging acceptance of the second battery pack.

18. The circuit according to claim 17, wherein the first, second, third and fourth controller are the same controller.

19. The circuit according to claim 18, wherein the controller comprises a microcontroller.

20. The circuit according to claim 17, wherein the first and second signal adjusters are the same signal adjuster.

21. The circuit according to claim 17 further comprising a pulse generator generating controlled pulses applied to the battery packs.

22. The circuit according to claim 17 further comprising a depolarization function applying a negative pulse to the battery packs during the charging/discharging process of the battery packs.

23. The circuit according to claim 17 further comprising a load and switching elements, wherein respective battery packs are connected in parallel to the load via a respective switching element.

* * * * *